United States Patent
Kamphuis

(10) Patent No.: US 8,577,400 B2
(45) Date of Patent: Nov. 5, 2013

(54) PROVISION OF VALUE ADDED SHORT MESSAGE SERVICES

(75) Inventor: Robert Engelbert Hubert Kamphuis, Ojakkala (FI)

(73) Assignee: Nokia Siemens Networks Oy, Espoo (FI)

( * ) Notice: Subject to any disclaimer, the term of this patent is extended or adjusted under 35 U.S.C. 154(b) by 432 days.

(21) Appl. No.: 12/864,043

(22) PCT Filed: Feb. 3, 2009

(86) PCT No.: PCT/EP2009/051190
§ 371 (c)(1),
(2), (4) Date: Jul. 22, 2010

(87) PCT Pub. No.: WO2009/098200
PCT Pub. Date: Aug. 13, 2009

(65) Prior Publication Data
US 2010/0298014 A1     Nov. 25, 2010

(30) Foreign Application Priority Data

Feb. 4, 2008  (EP) ..................................... 08151007

(51) Int. Cl.
*H04W 4/00*   (2009.01)
(52) U.S. Cl.
USPC ..................... 455/466; 455/412.1; 455/412.2; 455/417
(58) Field of Classification Search
USPC .................. 455/466, 412.1, 412.2, 414.1, 417
See application file for complete search history.

(56) References Cited

U.S. PATENT DOCUMENTS

| 7,209,759 | B1 | 4/2007 | Billing |
| 2005/0036457 | A1 | 2/2005 | Salin |
| 2008/0004049 | A1 | 1/2008 | Yigang et al. |

OTHER PUBLICATIONS

3rd Generation Partnership Project; Technical Specification Group Core Network and Terminals; Study into routeing of MT-SMs via the HPLMN (Release 7), 3GPP TR 23.840 V7.1.0, Mar. 2007, a total of 22 pages.
3rd Generation Partnership Project; Technical Specification Group Core Network and Terminals; Point-to-Point (PP) Short Message Service (SMS) support on mobile radio interface (Release 7), 3GPP TS 24.011 V7.0.0, Jun. 2007, a total of 105 pages.
3rd Generation Partnership Project; Technical Specification Group Core Network and Terminals; Technical realization of the Short Message Service (SMS) (Release 8), 3GPP TS 23.040 V8.0.0, Dec. 2007, a total of 199 pages.

*Primary Examiner* — Temica M Beamer
(74) *Attorney, Agent, or Firm* — Squire Sanders (US) LLP

(57) ABSTRACT

A network node of a communications system that routes short messages in a home network of a mobile station provides a service where one or more functions are invoked in response to receiving a request to forward a short message addressed to the mobile station. When the network node receives a request to forward a short message it determines a type of transmission of the received short message, where the type of transmission indicates whether or not a request for forwarding the same short message has been previously received in the network node. The network node then invokes functions of the service according to the determined type of transmission.

19 Claims, 4 Drawing Sheets

PROVISION OF VALUE ADDED SHORT MESSAGE SERVICES

FIELD OF THE INVENTION

The present invention relates to telecommunications and particularly to provision of value added short messages services in a communications system.

BACKGROUND OF THE INVENTION

Text messaging is a widely applied communication mechanism and the installed base of related network elements is significant. The present systems can provide value-added services to senders of short messages, but so far practical solutions for providing value added services to the receiving party have not been available.

The basic short message architecture relies on two main primitive services, mobile originated short message service (SM MO) and mobile terminated short message service (SM MT). In SM MO the short message is delivered from a sending mobile station to a service centre assigned to the sending mobile station, and is stored therein. In SM MT the service centre of the sending mobile station is delivered the stored short message to the receiving mobile station.

In conventional solutions, short messages are routed directly from the service centre to the destination, without necessarily involving any of the home network elements of the receiving mobile station. It is clear, however, that for any applicable mobile terminated value added services, information for provision of the services has to be maintained in the home network of that mobile station.

3GPP ($3^{rd}$ Generation Partnership Program) standardization work-groups have been actively working on an improved architecture that would allow provision of value added services also to the receiving users. The proposed solutions disclose a new network element and two models to how to apply it. The new network element is a mobile terminated short message router (MT SMS router) that is implemented in the home network of the receiving user. MT SMS router is involved in the transmission of short messages by diverting the conventional query for routing information from the home location register of the home network to the MT SMS router, and returning as the routing information the address of the MT SMS router, instead of the location of the receiving mobile station. In consequence, the subsequent short messages are first delivered to the MT SMS router where actions of value added services may be performed before the short message is relayed to the actual destination mobile station.

In a transparent mode the mobile terminated traffic is redirected through the MT SMS router but the control of transmissions and retransmissions remains in the originating end. If the receiving mobile station cannot be reached, the negative acknowledgement is forwarded to the MT SMS router, but then immediately relayed to the SMS service centre of the sending mobile station. In a conventional manner, the SMS service centre of the sending mobile station will then attempt to send the message according to an applied retransmission scheme. This transparent mode is typically strongly preferred, because it can be implemented without substantial changes to the operations in the sending mobile station end. The disadvantage is, however, that the control of retransmissions is in one location and the control of value added services in another. This may cause mismatch in the operations of some value added services, and thus prevent or at least impede successful implementation of MT value added services.

For example, one of the possible value added services for a receiving user is provision of carbon copy messages. In the auspices of the service, a copy of some or all received short messages is generated and delivered to a predefined other receiving mobile station. In case the original receiving mobile station is not reached with the first delivery attempt, the SMS service centre of the sending mobile station will retransmit the short message according to a predefined retransmission scheme. It may, however, be that the other receiving mobile is able to receive the carbon copy message already with the first attempt, or with any attempt before the original receiving mobile station is reached. In this case the delivery of carbon copies will continue until, for example, the timer is exceeded or also the original receiving mobile station is reached. This is not acceptable, because ease of use and reliable operation are of great importance, and this is especially true with widely used services, like SMS.

A non-transparent mode intercepts the mobile terminated SMS in the same way as the transparent mode, but the control of transmissions and retransmissions is in this case transferred to the MT SMS router. The MT SMS router stores short messages forwarded to it locally and returns automatically a positive acknowledgement to the sending SMS service centre. In case the delivery of the short message fails, it is the MT SMS router that retransmits the short message according to the applied retransmission scheme. The advantage of the non-transparent mode is that the control of value added services and the retransmissions are in the same place, and any possible mismatch between them can thus be easily eliminated. The problem is, however, that the transfer of control necessitates provision of a false indication to the sending party. On the basis of such indication, the sender may assume that his message is received, even if the receiving party may be out of reach for quite some time. This causes unacceptable confusion for the users of the value added service.

SUMMARY OF THE INVENTION

An object of the present invention is thus to provide a method and an apparatus for implementing the method so as to improve implementation of mobile terminated value added services and thereby alleviate at least some of the above disadvantages. The objects of the invention are achieved by a method, a device, a communications system, a home location register, a network node, and a computer program product, which are characterized by what is stated in the independent claims. The preferred embodiments of the invention are disclosed in the dependent claims.

The invention is based on the transparent mode, but the mechanism is improved by configuring the MT SMS router to recognize whether the incoming message is a new message or a retransmitted one and, when necessary, to adjust the implementation of the value added services on the basis of this information. The solution improves accuracy of value added service operations and increases user acceptance of such services. The invention provides several further advantages that are discussed in more detail with the respective embodiments.

BRIEF DESCRIPTION OF THE DRAWINGS

In the following the invention will be described in greater detail by means of preferred embodiments with reference to the attached drawings, in which.

DETAILED DESCRIPTION OF THE INVENTION

It is appreciated that the following embodiments are exemplary. Furthermore, although the specification may in various places refer to "an", "one", or "some" embodiment(s), reference is not necessarily made to the same embodiment(s), or the feature in question does not only apply to a single embodiment. Single features of different embodiments may be combined to provide further embodiments.

The present invention is applicable in elements of a communication system that supports short message services. As an example, short message service as specified in the 3rd Generation Partnership Project (3GPP) specifications 3GPP TS 23.040 V8.0.0 (2007-12) "Technical realization of the Short Message Service", 3GPP TR 23.840 V7.1.0 (2007-03) "Study into routeing of MT-SMs via the HPLMN", and 3GPP TS 24.011 V7.0.0 (2007-06) "Point-to-Point (PP) Short Message Service (SMS) support on mobile radio interface" is disclosed in more detail. It should be noted, however, that the scope of protection is not limited to the terms and definitions of the referred technology.

Figure 1:
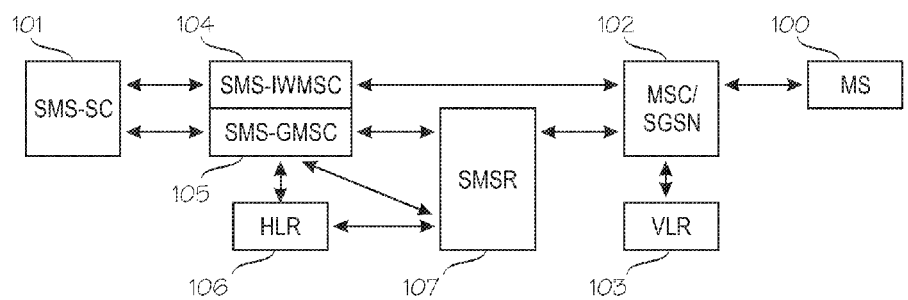
FIG. 1 illustrates elements used for the short message transfer in the embodied communications system.

The Short Message Service (SMS) provides means of sending messages of limited size to and from mobile user terminals. The referred 3GPP specifications apply to system applying Global System for Mobile Communications (GSM) or Universal Mobile Telecommunications Systems (UMTS). The provision of SMS makes use of a specific network element, a Service Centre, which acts as a store and forward centre for short messages. FIG. 1 illustrates elements used for the short message transfer in the embodied communications system. In the present embodiment, delivery of short messages to and from mobile stations is disclosed in more detail. It is noted that other types of devices, for example fixed and portable user terminals may be applied without deviating from the scope of protection.

The communications system comprises a mobile station MS 100 that represents here a mobile device, together with the software, applications, and content that are directly related to the device, which functions within and is supported by mobile infrastructure of the applied communications network. For short message service support the mobile station is configured to communicate via the communications system with a short message service centre SMS-SC 101 and exchange short message transfer protocol data units with it.

Mobile station 100 of the embodied communications system can be a simplified terminal for voice communication and short messaging or a multi-functional terminal for diverse services. In the latter case the terminal acts as a service platform and supports loading and execution of various functions related to the services. The mobile station 100 typically comprises mobile equipment and a subscriber identity module. The subscriber identity module is typically a smart card, often a detachably connected identification card, that holds the subscriber identity, performs authentication algorithms, and stores authentication and encryption keys and other subscription information that is needed at the mobile station. The mobile equipment may be any equipment capable of communicating in a mobile communication system or a combination of several pieces of equipment, for instance a multimedia computer to which a card phone has been connected to provide a mobile connection. In this context, the mobile station 100 thus refers to an entity formed by the subscriber identity module and the actual mobile equipment.

According to the specifications, the Short Message Service comprises two basic services, SM MT (Short Message Mobile Terminated) and SM MO (Short Message Mobile Originated). SM MT denotes the capability of the GSM/UMTS system to transfer a short message submitted from the SC to one MS, and to provide information about the delivery of the short message either by a delivery report or a failure report with a specific mechanism for later delivery. SM MO denotes the capability of the GSM/UMTS system to transfer a short message submitted by the MS to a short message entity via SC, and to provide information about the delivery of the short message either by a delivery report or a failure report.

In SM MO, a short message is delivered from the mobile station MS 100 to the short message service centre SMS-SC 101. Typically the subscriber inputs the message and a corresponding command through the user interface of the mobile station MS 100 that sends the text message over the air interface to the Mobile-services Switching Centre (MSC) or Serving GPRS Support Node (SGSN) 102. MS 100 retains the responsibility of the message until a report for the transmitted message arrives from the network; or a predefined timer expires. In case the element is MSC, it retrieves from a visitor location register VLR 103 the mobile subscriber international ISDN number (MSISDN) of the MS. If the retrieval is successful, MSC transfers the short message to an Interworking MSC For Short Message Service SMS-IWMSC 104. In case the element is SGSN, VLR 103 does not need to be consulted for MSISDN.

When SMS-IWMSC 104 receives a short message from the MSC/SGSN 102, it interrogates the HLR of the recipient and retrieves the recipient's IMSI in order to check for the existence of an SMS Interworking agreement before establishing a link with the addressed SMS-SC 101. If the SMS Interworking agreement exists, SMS-IWMSC 104 establishes a link with SMS-SC 101 and transfers the short message to it.

When SMS-SC 101 receives the message, it stores it and returns a report to the network acknowledging the reception. SMS-IWMSC 104 relays a received report to MSC/SGSN 102. If a report is not received from the SMS-SC 101 before a preset timer expires, SMS-IWMSC 104 returns error information to MSC/SGSN 102 in a failure report. MSC/SGSN 102 relays the report (success or failure) to MS 100.

In SM MT, the short message is stored in SMS-SC 101 and delivered to MS 100. At a defined time, SMS-SC 101 transmits the message to Gateway MSC For Short Message Service (SMS-GMSC) 105, towards the receiving MS 100. SMS-SC 101 typically retains the responsibility of the message until a report for the transmitted message has been received from MS, or until a predefined validity period expires. SMS-GMSC 105 interrogates home location register (HLR) 106 of the receiving subscriber for routing information, and transfers the short message to the MSC/SGSN 102 using the routing information obtained from the HLR 106.

In case of MSC, reception of the short message causes the MSC to retrieve from VLR 103 location area address of the receiving subscriber. If the retrieval is successful, MSC transfers the short message to MS 100 that acknowledges the reception with a delivery report. In case of SGSN, VLR 103 does not need to be consulted.

When MSC/SGSN 102 receives a confirmation that MS has received the message, it relays the positive confirmation in a delivery report to the SMS-GMSC 105. Otherwise it returns appropriate error information to the SMS-GMSC 105 in a failure report. SMS-GMSC 105 creates and sends a corresponding successful or failure report to SMS-SC 101.

SMS Router (SMSR) 107 is an optional entity, and is essentially used only in the MT case. It has been included in the configuration due to issues of misusage (e.g. fraud issues of SMS faking and distribution of junk mail), and new regulatory requirements that public mobile networks must meet (e.g. Number Portability and Lawful Interception). It is expected that SMS Router 107 will also be used to offer further value added services to SMS. It is evident that subscribers expect such services because they are already available in circuit switched and email communication.

Basically, without SMS routing, the network of the sending subscriber delivers short messages directly to the network where the receiving subscriber is currently attached. This means that if the receiving subscriber is roaming, a delivered short message does not pass through the receiving subscriber's home network at all. However, the home network is where the information for implementation of these services typically exists. In order to be able to provide any SMS value added services for the receiving user, the routing needs to force the subsequent delivery of the short message to a node that is not the serving MSC/VLR or SGSN, but the SMSR node 107 located in the subscribed network of the receiving MS. In the embodied communication system, this routing retrieval for SMS is realized by a previously defined MAP_SRI_For_SM operation that already involves the HPLMN of the receiving MS. Accordingly, once the home network of the receiving MS 100 receives the subsequent MAP_Forward_Short_Message that carries the actual message, it assumes responsibility of the delivery and possible implementation of value added services associated with the actual message.

In the following, operations of a communications system according to an embodiment of the invention are illustrated by means of a network configuration shown in FIG. 2. The illustrated basic service comprises delivery of a text message from a sending mobile station $MS_A$ 200 to a first receiving mobile station $MS_{B1}$ 201. In addition, as an example of a value added service, a carbon copy message of the original text message is generated to a second receiving mobile station $MS_{B2}$ 202 according to the information accessible in the home network of the first receiving user. In the exemplary configuration of FIG. 2, the home network of the sending mobile station $MS_A$ 200 PLMN (Public Land Mobile Network) NetworkA 203, the home network of the first receiving mobile station $MS_{B1}$ 201 and the second receiving mobile station $MS_{B2}$ 202 is PLMN NetworkB 204. At the time of delivery of the short message, the second receiving mobile station $MS_{B2}$ 202 is in its own home network NetworkB 204 and the first receiving mobile station $MS_{B1}$ 201 roams in a visited network NetworkC 205. Networks 203, 204, 205 are interconnected for SMS delivery as well known to a person skilled in the art.

FIG. 1 is a simplified system architecture that shows only selected elements and functional entities, all of which are logical units whose physical implementation may vary considerably. For conciseness, only elements necessary for describing the present embodiment are illustrated. In addition, the various roles of GMSC, IWMSC, and MSC discussed in more detail in connection with FIG. 1 are shown comprised in one MSC network element in each of the described networks. Separate or integrated implementation of these logical units of FIG. 2 is on the basis of the available specifications well known to a person skilled in the art and need not to be discussed in more detail here.

The home network NetworkA 203 of the sending mobile station $MS_A$ 200 comprises a mobile switching centre $MSC_A$ 231 that represents a network element that performs switching functions in its area of operation and controls the interworking with other networks. The home network NetworkB 204 of the receiving mobile stations $MS_{B1}$ 201, $MS_{B2}$ 202 comprises a corresponding mobile switching centre $MSC_B$ 241 and the visited network NetworkC 205 a corresponding mobile switching centre $MSC_C$ 251.

Figure 2:
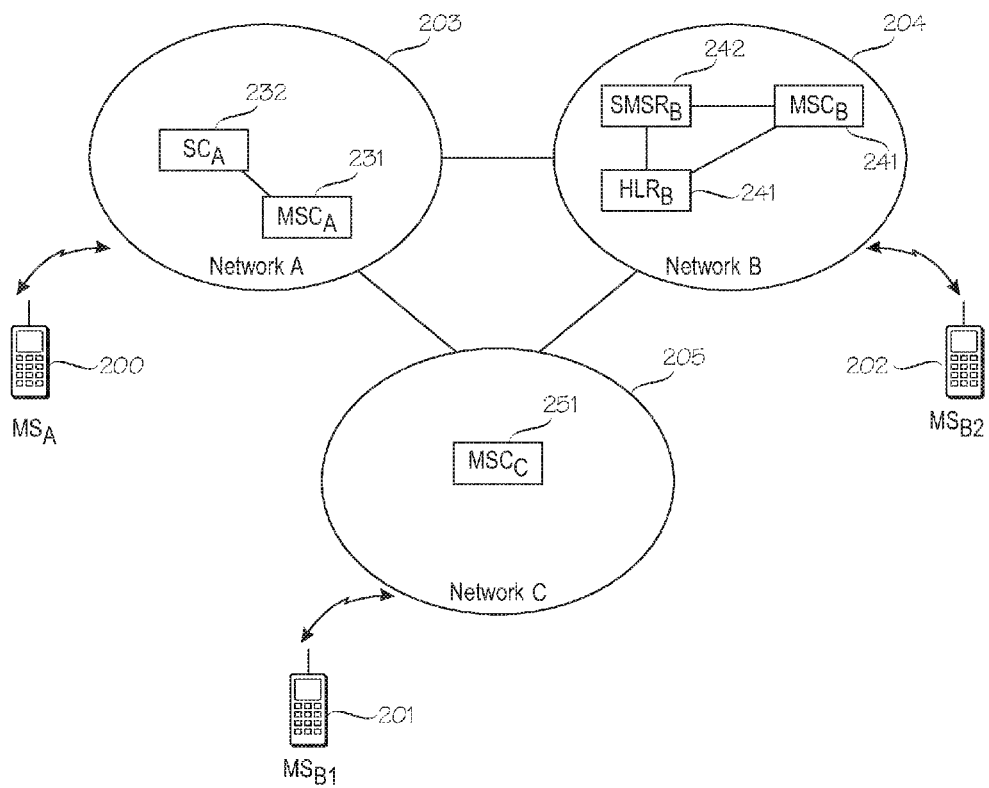
FIG. 2 illustrates an embodied network configuration.
Figure 3:
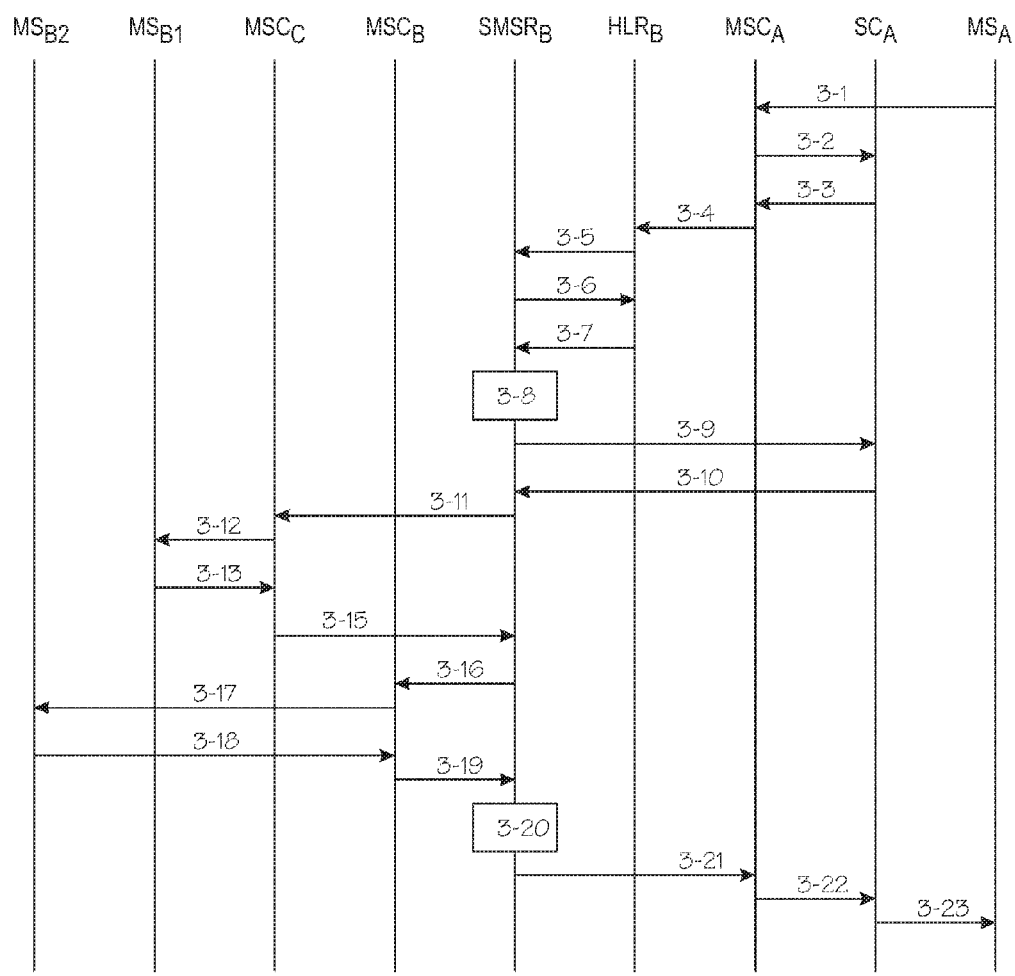
FIG. 3 illustrates an embodied procedure in the system configuration of FIG. 2.

FIG. 3 illustrates an embodied procedure in the system configuration of FIG. 2. The steps/points, signaling messages and related functions described in FIG. 3 are not necessarily in chronological order, and some of the steps/points may be performed simultaneously or in a different order from the given one. Only messages relevant for description of the invention are shown. Other functions can be executed between the steps/points or within the steps/points and other signaling messages sent between the illustrated messages. Some of the steps/points or part of the steps/points can also be left out or replaced by a corresponding step/point or part of the step/point.

The procedure begins by the sending mobile station $MS_A$ transmitting (step 3-1) the short message over the air interface to $MSC_A$. Along with the actual text of the short message, the destination address of the short message and the address of the short message service centre $MS_A$ are included in the transmission protocol data unit delivered from $MS_A$ to $MSC_A$. Typically the address of the short message service centre assigned to a mobile station is stored in the subscriber identity module of the mobile station.

$MSC_A$ passes (step 3-2) an application protocol data unit containing the short message to the service centre $SC_A$ for storing and subsequent delivery to the destination address. Typically $SC_A$ returns an acknowledgement indicating success or failure of the MO SM operation, and the message submission status is forwarded, through the mobile switching centre(s) and over the air interface to the mobile station (not shown).

$SC_A$ determines that it needs to attempt to deliver a short message to its destination, and sends (step 3-3) an application protocol data unit containing the text message, the destination phone number of the first receiving mobile station $MS_{B1}$ and other details to $MSC_A$. $MSC_A$, on receipt of this application protocol data unit, needs to discover the location of the receiving party. In order to do this, $MSC_A$ obtains routing information from the Home Location Register $NLR_B$ of the first receiving mobile station $MS_{B1}$. In the exemplary embodiment of FIG. 3, this is performed by $MSC_A$ invoking a MAP service package MAP_SEND_ROUTING_INFO_FOR_SM, which sends (step 3-4) a request for routing information (MAP_SRI_For_SM) MAP message to the Home Location Register $NLR_B$ of the first receiving mobile station MS, requesting the present location of $MS_{B1}$.

According to the specifications, the MSISDN of the destination $MS_{B1}$ is not included in the MAP_Forward_Short_Message and it is not possible to insert it there, because this would impact the present operation of the SMS interworking PLMNs and roaming partner PLMNs. Therefore, in order to correlate any subsequent MAP_Forward_Short_Message messages with the MAP_SRI_For_SM, the SMS Router $SMSR_B$ needs to service the MAP_SRI_For_SM. Accordingly, instead of performing a database lookup to retrieve the current location of $MS_{B1}$, upon receiving the MAP_SRI_For_SM request, $NLR_B$ determines not to answer the request itself but to relay (step 3-5) it on to the MT Short Message Router $SMSR_B$ of NetworkB. The exact method by which it does this is application specific. One possible method is to use signaling connection control part (SCCP) global title analysis and, for example, forward all MAP_SRI_For_SM messages that have not come from the SMS Router $SMSR_B$ on to the SMS Router $SMSR_B$. The determination may even be made on a per subscriber basis by usage of a flag in the subscriber' profile of the mobile station user.

Upon receiving the MAP_SRI_For_SM indication from $NLR_B$, $SMSR_B$ creates its own MAP_SRI_For_SM request message, using the information from the received MAP_SRI_For_SM indication message (including the received Service Centre Address). $SMSR_B$ sends (step 3-6) the MAP_SRI_For_SM request to $NLR_B$, which in turn responds (step 3-7) with a MAP_SRI_For_SM confirmation.

Upon receiving the MAP_SRI_For_SM confirmation from $NLR_B$, $SMSR_B$ creates a Correlation ID and stores (3-8) this along with the international mobile subscriber identity (IMSI), Network Node Number, Additional Number obtained from the MAP_SRI_For_SM confirmation from $NLR_B$, the mobile subscriber international ISDN number (MSISDN) of the receiving subscriber obtained from the MAP_SRI_For_SM indication originally from the $MSC_A$ in a local cache for a certain amount of time. For security purposes, $SMSR_B$ may also store the global title of the $MSC_A$.

The SMS Router sends (step 3-9) a MAP_SRI_For_SM response, using the data received from the MAP_SRI_For_SM confirmation from $NLR_B$, but with at least the following modifications:

the Network Node Number and/or the Additional Number are replaced by the global title of $SMSR_B$;
The IMSI IE is populated with a Correlation ID. As discussed above, there has to be means to identify a correlation between MAP_SRI_For_SM and the MAP_Forward_Short_Message messages. Since IMSI information element (IE) appears in both messages, a good option for this identification is to use this IMSI IE as the carrier of the correlation.

Upon receiving the MAP_SRI_For_SM response from $SMSR_B$, $SC_A$ invokes a MAP_MT_Forward_Short_Message MAP operation, which sends (step 3-10) a MAP_MT_Forward_Short_Message indication to $SMSR_B$. $SMSR_B$ takes the Correlation ID received in the IMSI IE and uses this as a key to determine the appropriate correlation by looking-up the real IMSI, Network Node Number, Additional Network Node Number, MSISDN and the Priority bit field of the originating MS stored in step 3-8.

If the correlation is successful, $SMSR_B$ sends (step 3-11) the message in one or more new MAP_MT_Forward_Short_Message messages to the mobile switching centre $MSC_C$ of network NetworkC, where the first receiving mobile station $MS_{B1}$ is currently. $MSC_C$ delivers (step 3-12) the short message conventionally to $MS_{B1}$. $MS_{B1}$ acknowledges (step 3-13) the delivery to $MSC_C$ that forwards (step 3-15) the acknowledgement message to $SMSR_B$, According to the invention, upon receiving the MAP_MT_Forward_Short_Message indication $SMSR_B$ also determines a type of transmission of the received short message. The type of transmission indicates whether or not a request for forwarding the short message has been previously received in the network node, i.e. whether the received short message is a new short message or a retransmitted short message resulting, for example, from a previous non-successful attempt. The determination may be implemented in several ways, but preferably $SMSR_B$ is configured to derive from received requests some predefined short message identification information, and on the basis of this short message identification information decide the type of transmission.

For example, in order to identify a short message, $SMSR_B$ may derive one or more of the following data elements:

MSISDN of the sending mobile station $MS_A$. This may be derived from the received MAP indication.
IMSI or ISDN of the receiving mobile station $MS_{B1}$. This may be derived with the IMSI IE used for correlation.
address of the SMS Service Centre $SC_A$ of the sending mobile station $MS_A$. Also this may be derived from the received MAP indication.
time stamp assigned to the short message by the SMS Service Centre $SC_A$ of the sending mobile station $MS_A$. Also this may be derived from the received MAP indication.
user data of the received short message
hash value computed from the user data of the short message
predefined part, for example the beginning of the short message.

Other data elements may be used without deviating from the scope of protection. The more elements are used, the more accurate the result of the determination is.

Using one or more of data elements, either separately or in combination, $SMSR_B$ determines whether the incoming MAP indication to forward a short message relates to a first attempt to deliver the short message, or whether there has already been previous attempts to deliver the same short message via $SMSR_B$.

$SMSR_B$ is also configured to provide a service that comprises one or more functions to be invoked when a request to forward a short message addressed to a mobile station is received. Typically such service is a value added service that may be configured by and/or for the receiving mobile station individually. On the basis of the result of the determined type of transmission, $SMSR_B$ adjusts the implementation of the service in respect of the first receiving mobile station $MS_{B1}$ by invoking functions of the service according to the determined type of transmission. The steps performed in $SMSR_B$ are denoted in FIG. 3 as 3-14. A more general description of the procedure performed in the embodied $SMSR_B$ in order to provide value added services at delivery of mobile terminated short messages is given in the following with FIG. 4.

Figure 4:
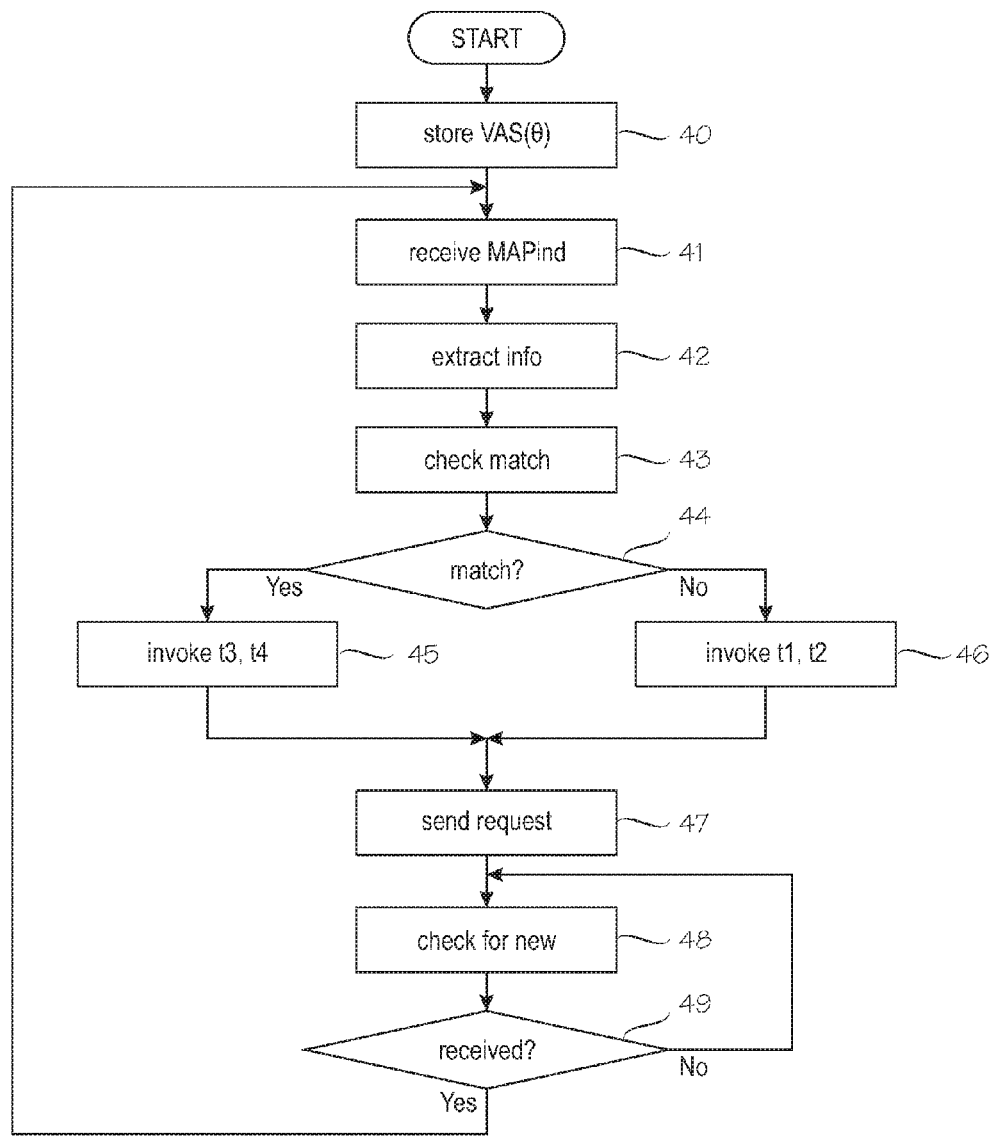
FIG. 4 illustrates steps of a procedure performed in the embodied MT SMS router.

In FIG. 4, the procedure is described for one service; application of the steps to further value added services is obvious for a person skilled in the art. In step 40, an application for a value added service VAS($\theta$) is stored in $SMSR_B$. The value added service VAS($\theta$) comprises a group of functions $\theta i \in$ (t1, t2, t3, . . . , tn) to be invoked when an indication of a short message to the first receiving mobile station $MS_{B1}$ is received. VAS($\theta$) is adjustable such that invocation of at least one function $\theta i$ in the implementation of the value added service is dependent on the type of transmission of the short message received from the short message service centre $SC_A$ of the sending mobile station $MS_A$.

In view of the embodiment of FIG. 3, the value added service VAS($\theta$) comprises functions for generating a carbon copy message to the mobile station $MS_{B2}$ when a short message addressed to mobile station $MS_{B1}$ is received the first time in $SMSR_B$. In addition, VAS is configured to avoid information accumulation in $SMSR_B$ by removing records on short messages that at some point of time expire from $SC_A$. Accordingly, function t1 of generation of the carbon copy message and function t2 of storing short message identification information of the short message to be delivered are to be invoked if the type of transmission indicates a first attempt to deliver the short message. Function t3 of checking the timestamp of the first transmission of the short message to be delivered and the optional function t4 of removing the record on the short message when a predefined validity period $t_{valid}$ for the short message in $SMSR_B$ has expired.

When $SMSR_B$ receives (step 41) a MAP indication on a short message to be delivered to $MS_{B1}$, it determines the type $T_{SMS}$ of transmission of the short message. In this exemplary embodiment, let us assume that the combination of MSISDN of the sending mobile station $MS_A$.
IMSI or ISDN of the receiving mobile station $MS_{B1}$.
The address of the SMS Service Centre $SC_A$ of the sending mobile station $MS_A$.
The time stamp assigned to the short message by the SMS Service Centre $SC_A$ of the sending mobile station $MS_A$.

denoted as ($MS_A$, $MS_{B1}$, $SC_A$, SCTS) is used as a basis for determining a correspondence between short messages in a previous transmission and the present transmission. Accordingly $SMSR_B$ extracts (step 42) short message identification information ($MS_A$, $MS_{B1}$, $SC_A$, SCTS) from the MAP indication and checks (step 43) whether the short message identification information matches with any of the previously stored short message identification information records in $SMSR_B$.

If a match with an earlier record is detected (step 44), the transmission is not the first attempt to deliver the short message and $SMSR_B$ invokes functions t3 and t4. This means that $SMSR_B$ retrieves from the earlier record the timestamp of the first transmission of the short message, determines the time period between the time stamp of the earlier record and the present time, and compares the determined time period with a predefined validity period for the short message. If the determined time period exceeds the validity period, the earlier record is removed from $SMSR_B$. Otherwise the procedure will continue directly to step 47.

If no match is detected (step 44), the transmission is the first attempt to deliver the short message and $SMSR_B$ invokes functions t1 and t2. As a result, $SMSR_B$ generates a carbon copy message of the short message to be delivered, and stores the short message identification information ($MS_A$, $MS_{B1}$, $SC_A$, SCTS) as a record for future use. When the functions t1, t2 have been performed, $SMSR_B$ forwards (step 47) the original MAP request towards $MS_{B1}$ and when applicable a request with the carbon copy short message towards $MS_{B2}$. $SMSR_B$ becomes standby for a new short message (step 48) and if such arrives, it returns (step 49) back to step 41 in a conventional manner described above.

Returning back to the embodiment of FIG. 3, when the first receiving mobile station $MS_{B1}$ is not immediately reached, the sending $SC_A$ gets a negative acknowledgement, and after a while makes a new attempt to deliver the message. Without the embodied solution, any one of these attempts would at the same time generate a new carbon copy that each and every time would also be delivered to $MS_{B2}$. This needs to be avoided, but the transparency of the operation of short message router cannot be compromised.

Accordingly, in step 3-14 of FIG. 3, $SMSR_B$ checks the type of the message in the MAP_MT_Forward_Short_Message indication, and determines that the indication relates to the first attempt to deliver the message and a carbon copy is generated. After this $SMSR_B$ retrieves location of $MS_{B2}$ and sends (step 3-16) the new MAP_MT_Forward_Short_Message messages to $MSC_B$ that delivers (step 3-17) the short message to $MS_{B2}$ in a conventional manner. $MS_{B2}$ may also operate normally; it can receive the carbon copy according to the preconfigured instructions of $MS_{B1}$, and acknowledge (step 3-18) the delivery to the $MSC_B$ that forwards it appropriately to $SMSR_B$ (step 3-19).

If $SMSR_B$ determines that delivery of the short message has already been attempted, it does not anymore generate the carbon copy. As a result of this, the delivery of copies functions more accurately and in a way generally accepted by mainstream users. Additional copies are not generated nor charged, which benefits all involved parties. The improved operation can be accomplished with a new element and a small change to one existing home network element responsible for the value added services of the user. The other network elements in other networks out in the field do not necessarily need to change.

According to the application, $SMSR_B$ may be further configured to adjust the implementation also in the acknowledgement phase. In step 3-20, $SMSR_B$ may check whether the action related to delivery reports need to be adjusted accordingly, as well. If not, the messages may be acknowledged separately without further interference from $SMSR_B$. Alternatively, one or either of the acknowledgement messages may be blocked or adjusted for improving the performance of the retransmission operation. For example, in some applications it is enough that either of the receiving mobile stations is reached. In case the first receiving mobile station $MS_{B1}$ is not reached but the second receiving mobile station $MS_{B2}$ is, $SMSR_B$ may be configured to replace the recipient information of $MS_{B2}$ in the positive acknowledgement message with the recipient information of $MS_{B1}$. When $SC_A$ receives such positive acknowledgement, it stops the unnecessary retransmissions automatically.

In the exemplary case presented in FIG. 3, only the successful transmission to $MS_{B1}$ is acknowledged (steps 3-21, 3-22) to $SC_A$. Depending on the settings of the sending mobile station $MS_A$, the successful delivery of the short message is also acknowledged (step 3-23) to $MS_A$.

The above example illustrates the operation with value added service for carbon copy delivery. It is clear that the scope of protection is not limited to this particular value added service, and that any type of value added service that may or needs to be adjusted according to the type of the incoming message may be applied without deviating from the scope of protection. Other alternatives comprise, for example, delivery of Out Of Office—messages such that the Out Of Office—message does not end up being delivered to the sender of the original short message with every attempt. The invention is also applicable to solutions where short messages are delivered with additional tagged information, for example advertisements. The service may be adjusted to tag the information to subsequent short messages controllably, for example according to a predefined scheme agreed with the advertiser. In case of concatenated short messages, the service may be further adjusted to alert $SC_A$ to do a further delivery attempt of a subsequent part of the short message only after the first part and any of the associated functions of the service have been implemented.

Figure 5A:
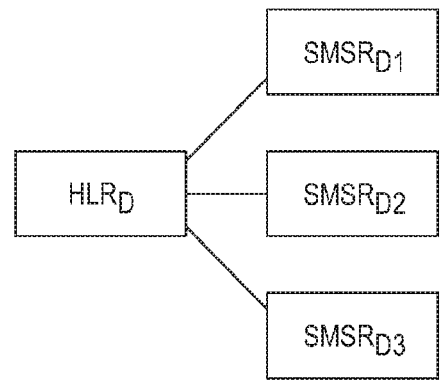
FIGS. 5A and 5B illustrate embodiments where the home location register $HLR_B$ is connected to more than one MT SMS routers.
Figure 5B:
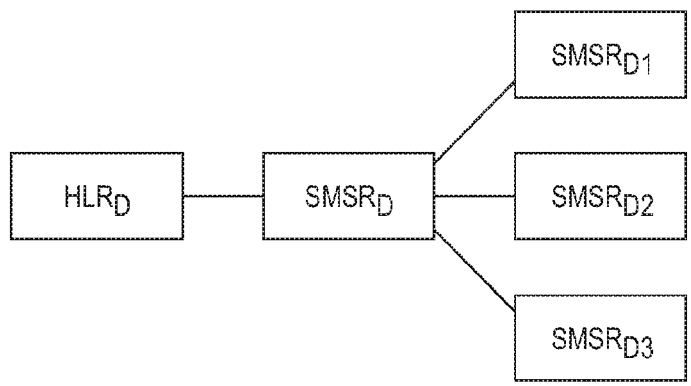

In the basic solution $HLR_B$ only decides whether to respond to the routing request itself or to forward the request to $SMSR_B$. However, it is likely that there will be a lot of traffic from and to the MT SMS router and network operators will provide more than one MT SMS router elements in their networks. FIGS. 5A and 5B illustrate embodiments where the home location register $HLR_D$ is connected to more than one MT SMS routers $SMSR_{D1}$, $SMSR_{D2}$, $SMSR_{D3}$, and $HLR_D$ is configured to balance the load by diverting the requests to the MT SMS routers in variable manner. The criterion used for providing the necessary variation may change according to the application.

In the embodiment of FIG. 5A the MT SMS routers $SMSR_{D1}$, $SMSR_{D2}$, $SMSR_{D3}$ are connected directly to the $HLR_D$. Upon receiving the short message indication, $HLR_D$ is further configured to analyze the number of the first receiving user and select the target MT SMS router on the basis of the analysis. For example, $HLR_D$ may store a table where MSISDN of a receiving mobile station is associated with a MT SMS router. When a new request comes in, $HLR_D$ checks the MSISDN of the target mobile station, finds from the table a MT SMS router address that corresponds with the MSISDN and forwards the message to the determined MT SMS router. As another example, the number range of the subscribers of $HLR_D$ may be divided to subranges and each of the subrange is associated with a particular MT SMS router $SMSR_{D1}$, $SMSR_{D2}$, $SMSR_{D3}$. Each MT SMS router deals with part of the traffic, and thereby serves a subset of the subscribers.

In case of a more holistic view to the subscriber information and related traffic is needed, only one element may communicate with the home location register. In the configuration in embodiment of FIG. 5B, between $HLR_D$ and MT SMS routers $SMSR_{D1}$, $SMSR_{D2}$, $SMSR_{D3}$ there is an intermediary element $SMSR_D$ that communicates with $HLR_D$ as disclosed above, and balances the load between the MT SMS routers. Load balancing may be implemented according to a defined mobile terminated short message router loading scheme; either statically, for example on the basis of number analysis as described above, or dynamically, for example, on the basis of present load statistics.

Either of the embodiments of FIGS. 5A and 5B improve the consistency of load balancing with the MT SMS routing operations and thus improves the reliability of MT SMS operations in the system.

Figure 6:
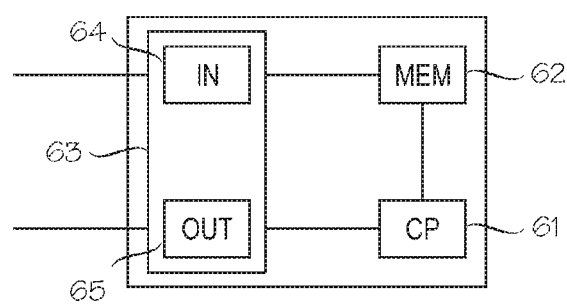
FIG. 6 illustrates the structure of an embodiment of an apparatus.

FIG. 6 illustrates an exemplary hardware configuration for the implementation of an embodied device, for example applicable as the MT SMS router, the intermediary element $SMSR_D$ or the home location register $HLR_D$ disclosed above. The device comprises a control unit 61, an element that comprises an arithmetic logic module; a number of special registers and control circuits. Connected to the processing unit is a memory unit 62, a data medium where computer-readable data or programs or user data can be stored. The memory means typically comprise memory modules that allow both reading and writing (RAM), and memory modules whose contents can only be read (ROM). The unit also comprises an interface block 63 with input unit 64 for inputting data for internal processing in the element, and output unit 65 for outputting data from the internal processes of the element.

Examples of said input unit 64 comprise plug-in units acting as a gateway for information delivered to its external connection points. For receiving information from the operator, the input unit 64 may also comprise a key-pad, or a touch screen, a microphone, or the like. Examples of said output unit 65 include plug-in unit feeding information to the lines connected to its external connection points. For outputting information to the operator, the output unit 65 may also comprise a screen, a touch screen, a loudspeaker, or the like.

The control unit 61, memory unit 62, and interface block 63 are electrically interconnected to perform systematic execution of operations on received and/or stored data according to predefined, essentially programmed processes of the element. In solutions according to the embodiments of the invention, these operations comprise functions for implementing the logical units, operations and interfaces of the MT SMS router, as described above. The various embodiments of the invention may be implemented as a combination of computer programs and the respective units disclosed above.

The computer programs may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and/or a computer readable compressed software package.

It will be obvious to a person skilled in the art that, as the technology advances, the inventive concept can be implemented in various ways. The invention and its embodiments are not limited to the examples described above but may vary within the scope of the claims.

The invention claimed is:

1. A method, comprising:
   routing mobile terminated short messages in a network node of a communications system;
   providing a service comprising one or more functions to be invoked in response to receiving a request to forward a mobile terminated short message addressed to a mobile station;
   receiving a request to forward a mobile terminated short message;
   determining a type of transmission of the received mobile terminated short message, the type of transmission indicating whether or not a request for forwarding the same mobile terminated short message has been previously received in the network node;
   adjusting an implementation of the service for the mobile terminated short message on the basis of the determined type of transmission of the mobile terminated short message; and
   invoking adjusted functions of the service according to the determined type of transmission,
   wherein the adjusted functions of the service comprise storing short message identification information of the mobile terminated short message.

2. A method according to claim 1, further comprising
   extracting from the received request short message identification information on the message to be delivered; and
   determining the type of transmission on the basis of the short message identification information.

3. A method according to claim 1, further comprising the service comprising a function to generate the carbon copy message of the original message to a defined mobile station, or a function to deliver an out-of-office message to the sender of the original message, or a function to include additional piece of information to the original short message.

4. A device, comprising:
   a memory configured to store information for routing short messages and information on a service, the memory comprising one or more functions;
   an interface unit configured to communicate with a communications system for sending and receiving requests to forward short messages; and
   a control unit operatively connected with the memory and the interface unit and configured to operate the device to
   receive a request to forward a mobile terminated short message;
   determine a type of transmission of the received mobile terminated short message, the type of transmission indicating whether or not a request for forwarding the same mobile terminated short message has been previously received in the network node;

adjust an implementation of the service for the mobile terminated short message on the basis of the determined type of transmission of the mobile terminated short message; and invoke adjusted functions of the service according to the determined type of transmission, wherein the adjusted functions of the service comprise storing short message identification information of the mobile terminated short message.

5. A device according to claim 4, wherein by the control unit is further configured to operate the device to:

extract from the received request short message identification information on the mobile terminated message to be delivered; and determine the type of transmission on the basis of the short message identification information.

6. A device according to claim 4, the service comprising a function to generate the carbon copy message of the original message to a defined mobile station number, or a function to deliver an out-of-office message to the sender of the original message, or a function to include additional piece of information to the original short message.

7. A device according to claim 4, the device being a mobile terminated short message router.

8. A home location register for a communications system, the home location register comprising:

an interface unit configured to operatively connect the home location register to two or more mobile terminated short message routers; and a control unit operatively connected with the interface unit and configured to operate the home location register to send and receive requests for routing information for a mobile terminated short message to a mobile station;

determine a type of transmission of the received mobile terminated short message, the type of transmission indicating whether or not a request for forwarding the same mobile terminated short message has been previously received in the home location register;

adjust an implementation of a service, the service comprising one or more functions, for the mobile terminated short message on the basis of the determined type of transmission of the mobile terminated short message;

perform a number analysis of the mobile station; and forward a request for short message routing information to one of the mobile terminated short message routers on the basis of the analysis, wherein the analysis comprises at least one of a number analysis and present load statistics.

9. A network node for a communications system, the network node comprising:

an interface unit configured to operatively connect network node to two or more mobile terminated short message routers and a home location register; and a control unit operatively connected with the interface unit and configured to operate the network node to receive from the home location register a request for routing information for a mobile terminated short message to a mobile station;

determine a type of transmission of the received mobile terminated short message, the type of transmission indicating whether or not a request for forwarding the same mobile terminated short message has been previously received in the network node;

adjust an implementation of a service, the service comprising one or more functions, for the mobile terminated short message on the basis of the determined type of transmission of the mobile term terminated short message; and forward a request for short message routing information to one of the mobile terminated short message routers on the basis of a defined mobile terminated short message router loading scheme, wherein the defined mobile terminated short message router loading scheme comprises at least one of a number analysis and present load statistics.

10. A communications system, comprising a device of claim 4.

11. A communications system according to claim 10, further comprising two or more mobile terminated short message routers and the home location register of claim 8.

12. A communications system according to claim 10, further comprising two or more mobile terminated short message routers, a home location register and the network node of claim 9.

13. A computer program product readable by a computer and encoding a computer program of instructions for executing a computer process for controlling functions in a network node of a communication system, the process including:

routing mobile terminated short messages in a network node of a communications system;

providing a service comprising one or more functions to be invoked in response to receiving a request to forward a mobile terminated short message addressed to the mobile station;

receiving a request to forward a mobile terminated short message;

determining a type of transmission of the received short message, the type of transmission indicating whether or not a request for forwarding the same mobile terminated short message has been previously received in the network node;

adjusting an implementation of the service for the mobile terminated short message on the basis of the determined type of transmission of the mobile terminated short message; and invoking adjusted functions of the service according to the determined type of transmission, wherein the adjusted functions of the service comprise storing short message identification information of the mobile terminated short message.

14. A method, comprising:

routing mobile terminated short messages in a network node of a communications system;

providing a service comprising one or more functions to be invoked in response to receiving a request to forward a short message addressed to a mobile station;

receiving a request to forward a mobile terminated short message;

determining a type of transmission of the received mobile terminated short message, the type of transmission indicating whether or not a request for forwarding the same mobile terminated short message has been previously received in the network node;

invoking functions of the service according to the determined type of transmission;

extracting from the received request short message identification information on the message to be delivered;

determining the type of transmission on the basis of the short message identification information; and in response to the type of transmission indicating that a request to forward the same mobile terminated short message has not been previously received in the network node, storing the received request short message identification information to the network node.

15. A method according to claim 14, further comprising
comparing short message identification information of a received request with short message identification information stored in the network node; and
determining the type of transmission to indicate that a request to forward the same mobile terminated short message has been previously received in the network node if the short message identification information matches with the short message identification information stored in the network node.

16. A method according to claim 14, further comprising, in response to the type of transmission indicating that a request to deliver the same mobile terminated short message has been previously received in the network node,
determining a first time stamp included in the received request;
determining a second time stamp included in short message information stored in the network node;
determining the period between the first time stamp and the second time stamp; and
deleting the short message information stored in the network node in response to the period exceeding a predefined threshold.

17. A device, comprising:
a memory configured to store information for routing mobile terminated short messages and information on a service comprising one or more functions;
an interface unit configured to communicate with a communications system for sending and receiving requests to forward mobile terminated short messages;
a control unit operatively connected with the memory and the interface unit and configured to operate the device to
receive a request to forward a mobile terminated short message;
determine a type of transmission of the received mobile terminated short message, the type of transmission indicating whether or not a request for forwarding the same mobile terminated short message has been previously received in the network node;
invoke functions of the service according to the determined type of transmission;
extract from the received request short message identification information on the message to be delivered;
determine the type of transmission on the basis of the short message identification information;
in response to the type of transmission, indicate that a request to forward the same mobile terminated short message has not been previously received in the device; and
store the received request short message identification information to the memory.

18. A device according to claim 17, wherein the control unit is further configured to operate the device to:
compare short message identification information of a received request with short message identification information stored in the memory; and
determine the type of transmission to indicate that a request to forward the same mobile terminated short message has been previously received in the device if the short message identification information matches with the short message identification information stored in the memory.

19. A device according to claim 17, wherein by the control unit is further configured to operate the device to:
in response to the type of transmission indicating that a request to deliver the same mobile terminated short message has been previously received in the device,
determine a first time stamp included in the received request;
determine a second time stamp included in short message information stored in the memory; and
determine the period between the first time stamp and the second time stamp;
delete the short message information stored in the device in response to the period exceeding a predefined threshold.

* * * * *